C. G. DEMING.
WAGON-BRAKE.
No. 183,651.          Patented Oct. 24, 1876.
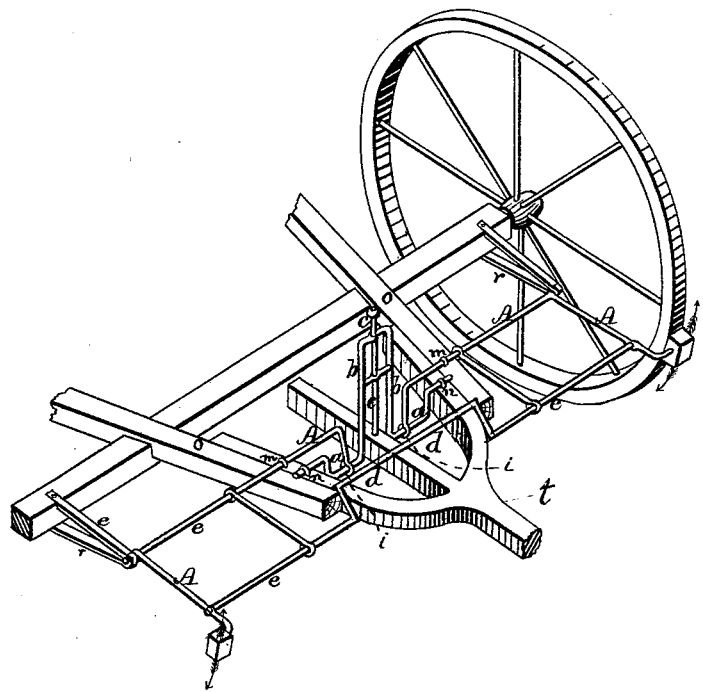
Witnesses:
Jas. C. Hutchinson.
D. P. Cowl
Inventor-
C. G. Deming

UNITED STATES PATENT OFFICE.

CHARLES G. DEMING, OF HIGH POINT, NORTH CAROLINA.

IMPROVEMENT IN WAGON-BRAKES.

Specification forming part of Letters Patent No. 183,651, dated October 24, 1876; application filed October 12, 1876.

*To all whom it may concern:*

Be it known that I, CHARLES G. DEMING, of High Point, in the county of Guilford and State of North Carolina, have invented a new and useful Improvement in Brakes for Wheeled Vehicles, which improvement is fully set forth in the following specification, reference being had to the accompanying drawings.

The object of my invention is a self-acting brake by means of a circular motion produced by the combination of the levers or cranks A A and the action of the wheel, when said levers or cranks are exercised by any power whatever, together with the adjusting levers or cranks $a\,b$, with the pin $c$ or its equivalent, as shown in the accompanying drawing, where the vehicle is a wagon.

The tongue of the vehicle is held in its place within the hounds $o\,o$ by means of the brake-bars A A, having eyes $i\,i$, and the adjusting crank-bolt $a\,b$, with their fastening eyebolts $m\,m$ and $n\,n$, respectively. $r\,r$ are rods extending from the axle to the brake-bars A A, as supporters to said brake-bars in common with the hounds.

The brake-bars are crank-shaped, so as to make the brake-block move in the arc of a circle, the center of which is within the circumference of the wheel, and should be on a line horizontal with the center of the wheel, as in this position the movement upward and downward is equalized.

The combination of the forces of the wheel and brake causes an increase of pressure when the brake is applied downward, (which is its normal action,) the wheel moving forward, and a decrease of pressure when the wheel moves backward. The reverse of this is true when the brake is applied upward.

I disclaim the devices shown in the patent of Wm. Ballard, June 23, 1868, No. 79,186, which differs materially from my invention.

The adjusting-crank $a\,b$ is held in a perpendicular position by a pin, $c$, or its equivalent, by the lifting of which and a corresponding pressure upon the crank $a\,b$ the brake is raised or lowered irrespective of the action of the tongue.

If, in the application of the brake, it is necessary to fasten both the brake-bars and the adjusting-crank beneath the hounds and tongue, the lever $b\,b$, holding the pin $c$, will need to be bent in the opposite direction.

So, also, the cranks of the brake-bars A A may be made to lie in the same plane.

The brake may be applied to the rear wheels by means of rods attached to the adjusting-crank $a\,b$.

The parts $d$ and $e$ only serve to strengthen the brake, and may be dispensed with.

I claim as my invention—

1. The crank-shaped brake-bars, as described, fastened to hounds and bolt by means of iron eyebolts $m\,m$ and eyes $i\,i$, as herein described, and for the purposes set forth.

2. The adjusting crank-bar $a\,b$, fastened to the tongue $t$ by iron bands $n\,n$, and the pin $c$, as herein described, and for the purposes set forth.

3. The brake-bar A, pivoted to a support, $r$, between the center and periphery of a vehicle-wheel, and capable of being applied upward by a lever, or downward by the operation of the tongue, substantially as shown, and for the purposes set forth.

C. G. DEMING.

Witnesses:
E. A. SNOW,
W. H. SNOW.